United States Patent
Otani

(10) Patent No.: US 8,281,305 B2
(45) Date of Patent: Oct. 2, 2012

(54) METHOD AND APPARATUS FOR RESOURCE PROVISIONING

(75) Inventor: Toshio Otani, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 921 days.

(21) Appl. No.: 12/253,396

(22) Filed: Oct. 17, 2008

(65) Prior Publication Data

US 2010/0100878 A1 Apr. 22, 2010

(51) Int. Cl.
*G06F 9/455* (2006.01)
(52) U.S. Cl. .......................................... 718/1
(58) Field of Classification Search ................ 718/1
See application file for complete search history.

(56) References Cited

U.S. PATENT DOCUMENTS

| | | | |
|---|---|---|---|
| 6,260,120 B1 * | 7/2001 | Blumenau et al. | 711/152 |
| 6,295,575 B1 * | 9/2001 | Blumenau et al. | 711/5 |
| 6,421,711 B1 * | 7/2002 | Blumenau et al. | 709/213 |
| 6,779,083 B2 * | 8/2004 | Ito et al. | 711/114 |
| 7,206,860 B2 * | 4/2007 | Murakami et al. | 709/238 |
| 7,613,809 B2 * | 11/2009 | Jackson et al. | 709/226 |
| 7,644,160 B2 * | 1/2010 | Young | 709/225 |
| 7,822,594 B2 * | 10/2010 | Haviv et al. | 703/21 |
| 7,836,332 B2 * | 11/2010 | Hara et al. | 714/5.11 |
| 7,945,908 B1 * | 5/2011 | Waldspurger et al. | 718/1 |
| 2007/0127367 A1 * | 6/2007 | Ogasahara et al. | 370/226 |
| 2008/0243947 A1 * | 10/2008 | Kaneda | 707/203 |
| 2008/0270564 A1 * | 10/2008 | Rangegowda et al. | 709/212 |
| 2009/0025007 A1 * | 1/2009 | Hara et al. | 718/105 |
| 2009/0292858 A1 * | 11/2009 | Lambeth et al. | 711/6 |
| 2010/0054129 A1 * | 3/2010 | Kuik et al. | 370/235 |

FOREIGN PATENT DOCUMENTS

EP 2017711 A2 * 1/2009

OTHER PUBLICATIONS

VMware ESX Server Version 3.5 SAN Configuration Guide, pp. 12-20, 1998-2005.
Sun Microsystems Documentation; Chapter 6—Configuring Virtual Fibre Channel Ports, 1994-2008.

* cited by examiner

*Primary Examiner* — Aimee Li
(74) *Attorney, Agent, or Firm* — Mattingly & Malur, PC

(57) ABSTRACT

Embodiments of the invention provide a method and apparatus for resource provisioning for a new virtual machine to be provided in a computer device. In one embodiment, at least one storage subsystem, the computer device, and a storage management server are connected via a network. A unique virtual port name for the new virtual machine is created by one of a first storage subsystem of the at least one storage subsystem or the storage management server. A volume for the new virtual machine is provided in the first storage subsystem. The first storage subsystem includes a unique port name for a port through which the volume for the new virtual machine has I/O connection via the network. The unique virtual port name is assigned to the new virtual machine in the computer device under NPIV (N_Port ID Virtualization).

21 Claims, 17 Drawing Sheets

Procedure of adding new VM

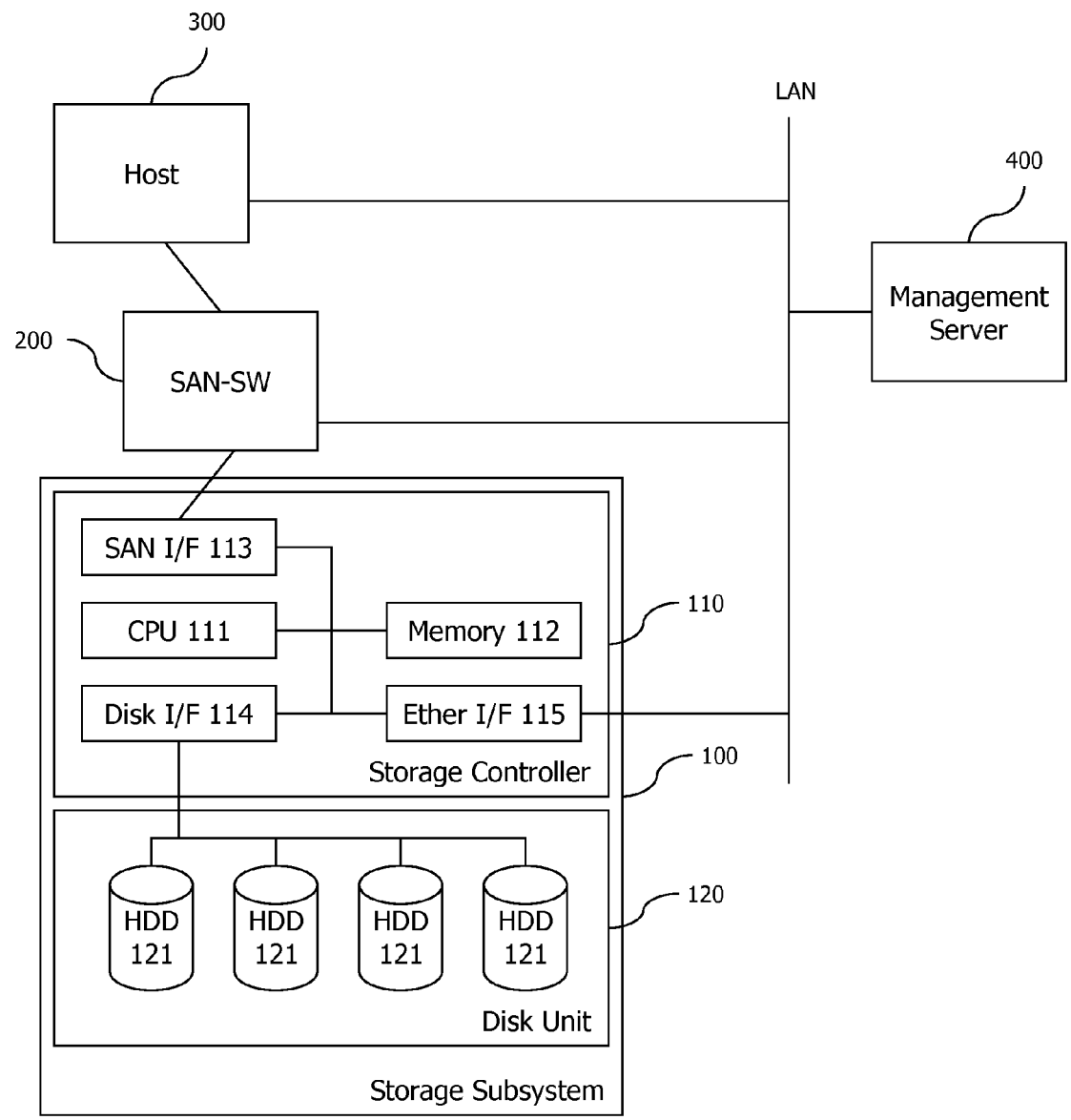
Fig.1 System Configuration

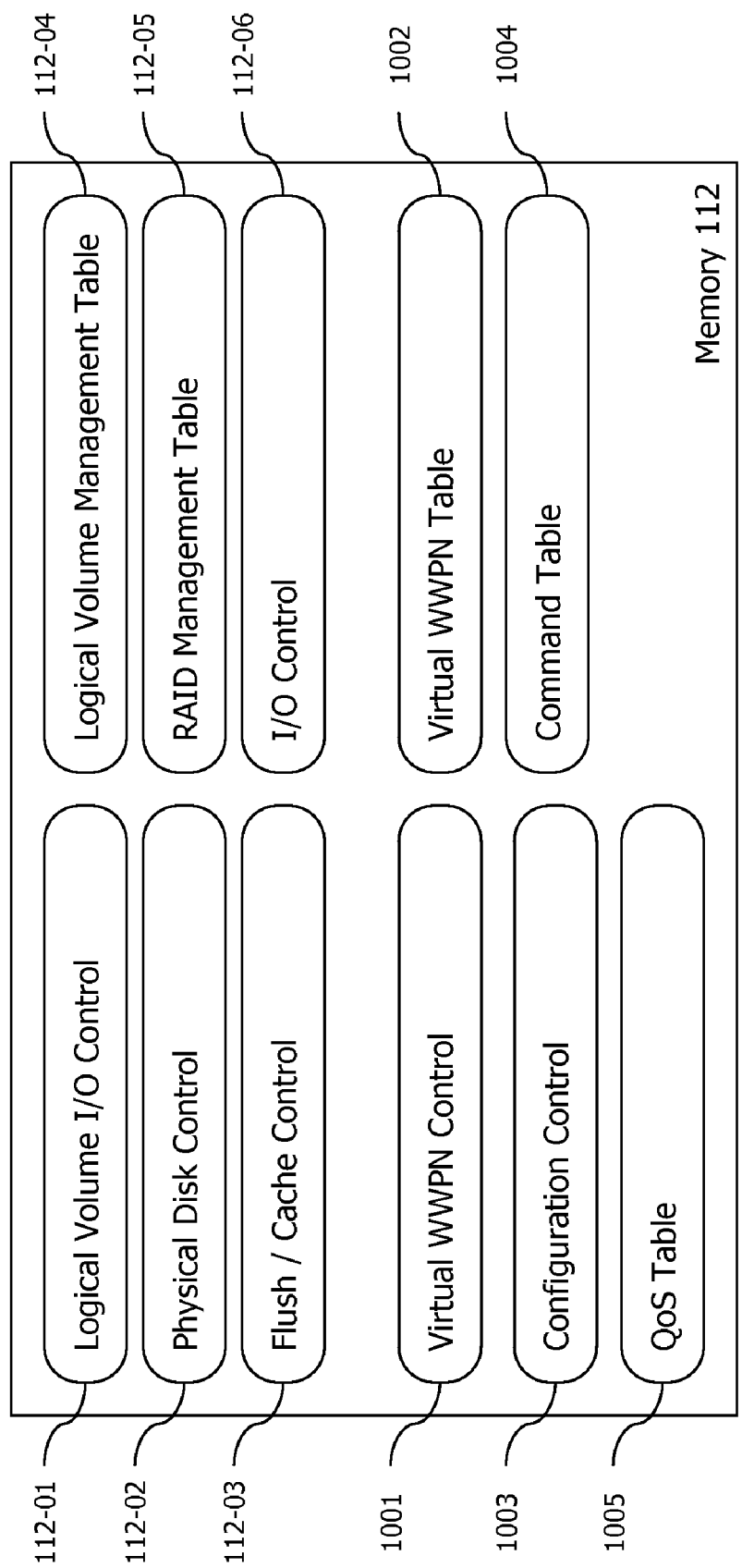
Fig.2 Software Module Configuration on Storage Controller

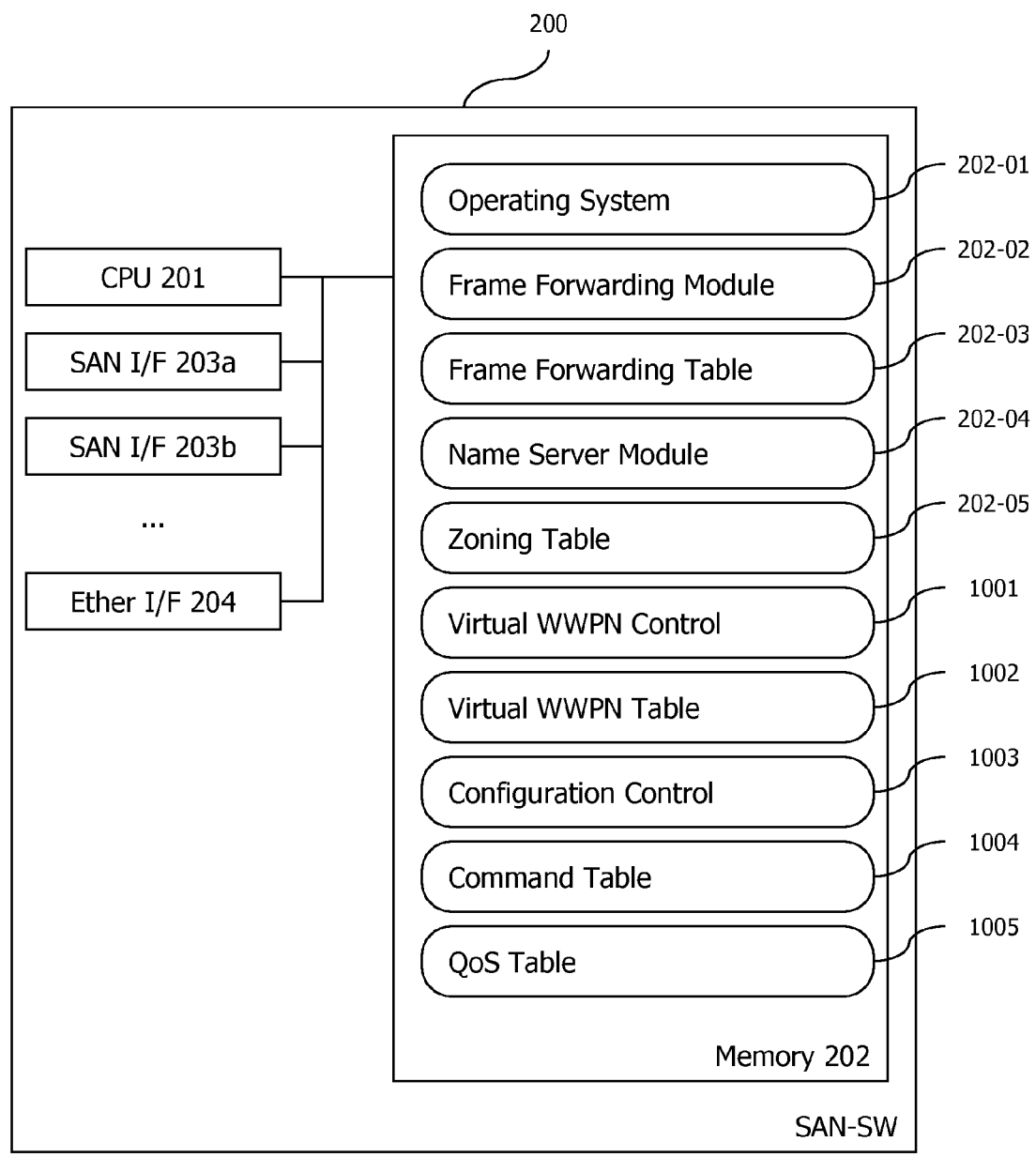
Fig.3 Configuration of SAN-SW

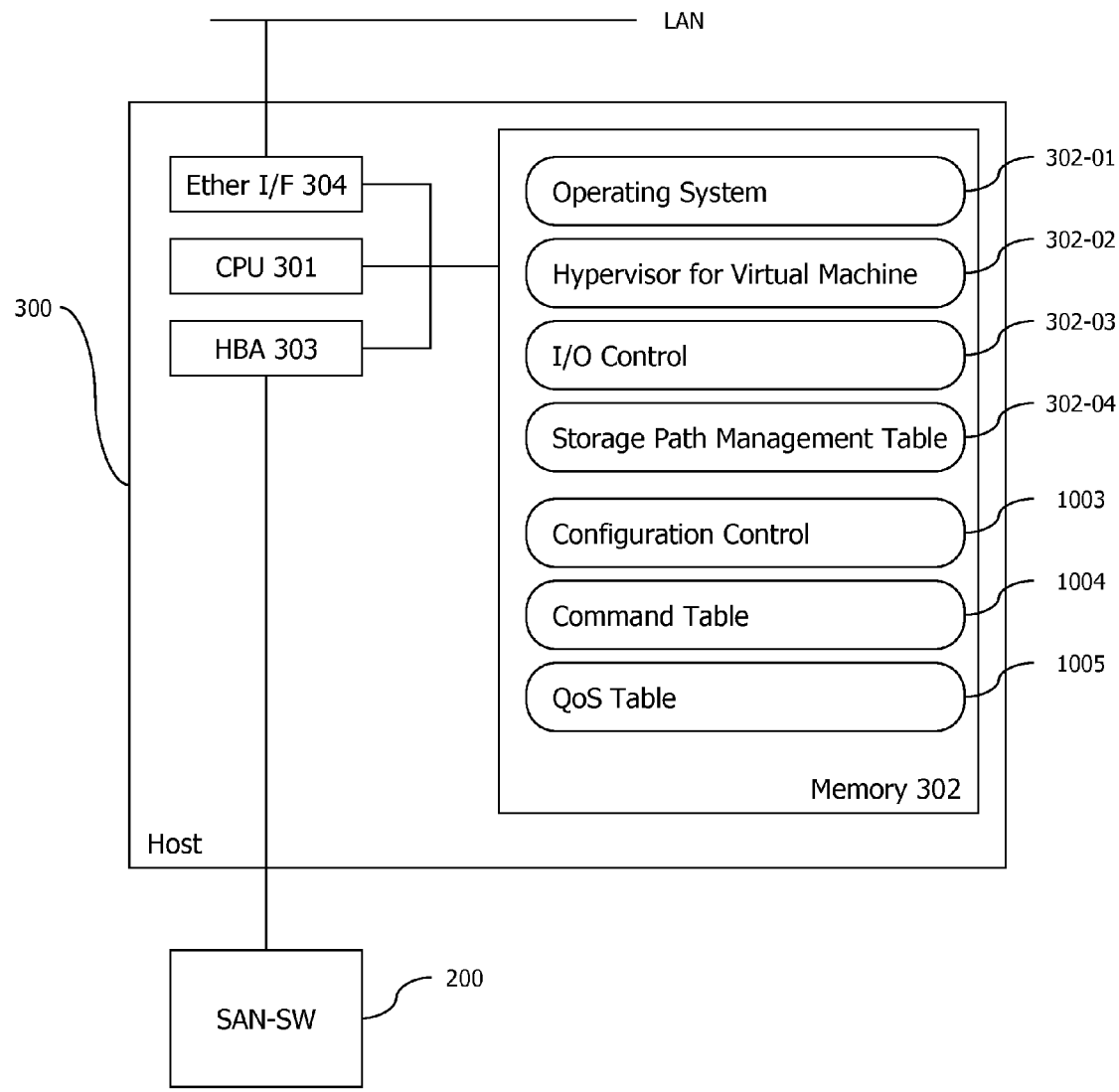
Fig.4 Configuration of Host

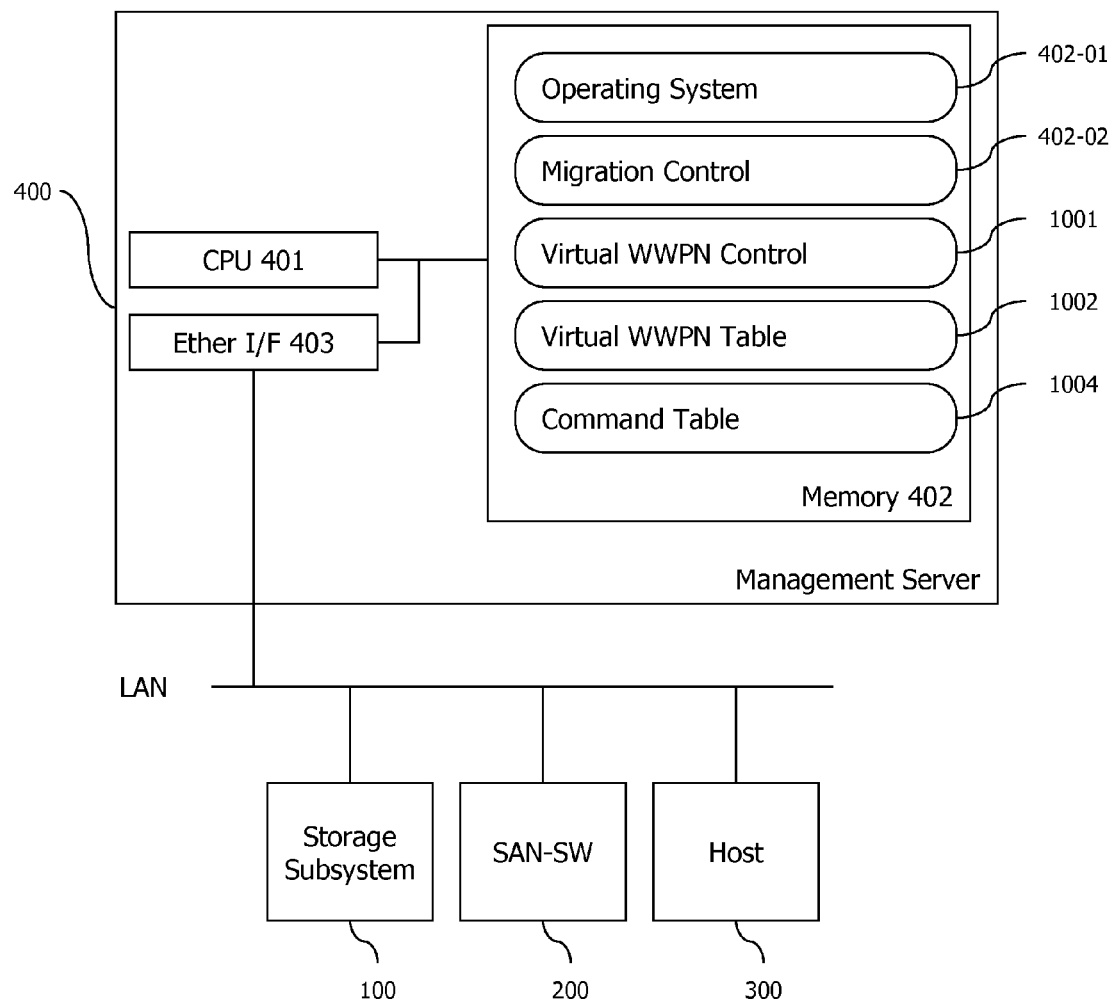
Fig.5 Configuration of Management Server

| Initiator WWPN | Target WWPN | LUN | VOL # |
|---|---|---|---|
| 10:00:00:60:69:00:05:01 | 01:34:55:30:42:00:03:01 | 0 | 0 |
| 10:00:00:60:69:00:05:02 | 01:34:55:30:42:00:03:01 | 0 | 1 |
| 10:00:00:60:69:00:05:03 | 01:34:55:30:42:00:03:01 | 0 | 2 |
| 10:00:00:60:69:00:05:04 | 01:34:55:30:42:00:03:01 | 0 | 3 |
| 10:00:00:60:69:00:05:04 | 01:34:55:30:42:00:03:01 | 1 | 4 |
| 10:00:00:60:69:00:05:05 | 01:34:55:30:42:00:03:01 | 0 | 5 |

Logical Volume Management Table 112-04

Fig.6 Example of Logical Volume Management Table

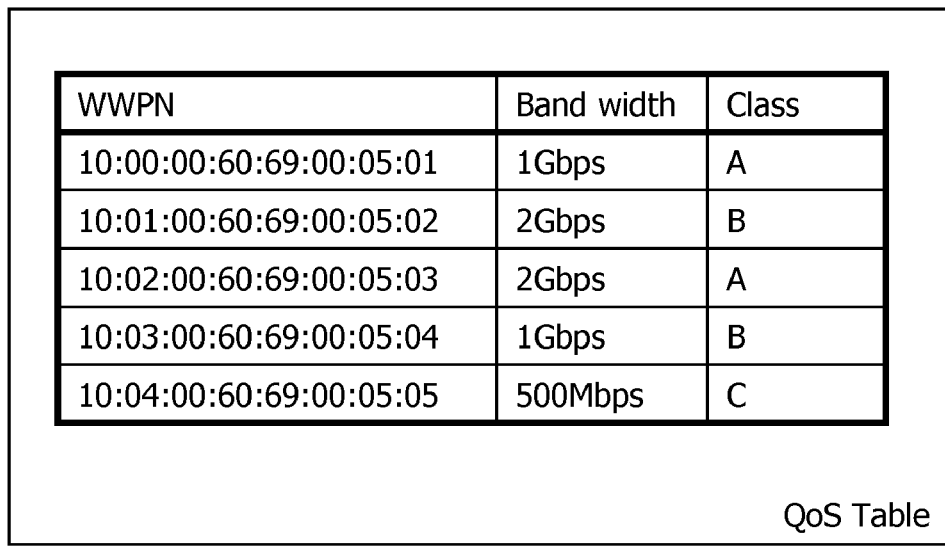
Fig.7 Example of QoS Table

| Zone Name | Member |
|---|---|
| Zone 501 | 10:00:00:60:69:00:05:01, 01:34:55:30:42:00:03:01 |
| Zone 502 | 10:00:00:60:69:00:05:02, 01:34:55:30:42:00:03:01 |
| Zone 503 | 10:00:00:60:69:00:05:03, 01:34:55:30:42:00:03:01 |
| Zone 504 | 10:00:00:60:69:00:05:04, 01:34:55:30:42:00:03:01 |
| Zone 505 | 10:00:00:60:69:00:05:05, 01:34:55:30:42:00:03:01 |

— 202-05

Zoning Table

Fig.8 Example of Zoning Table

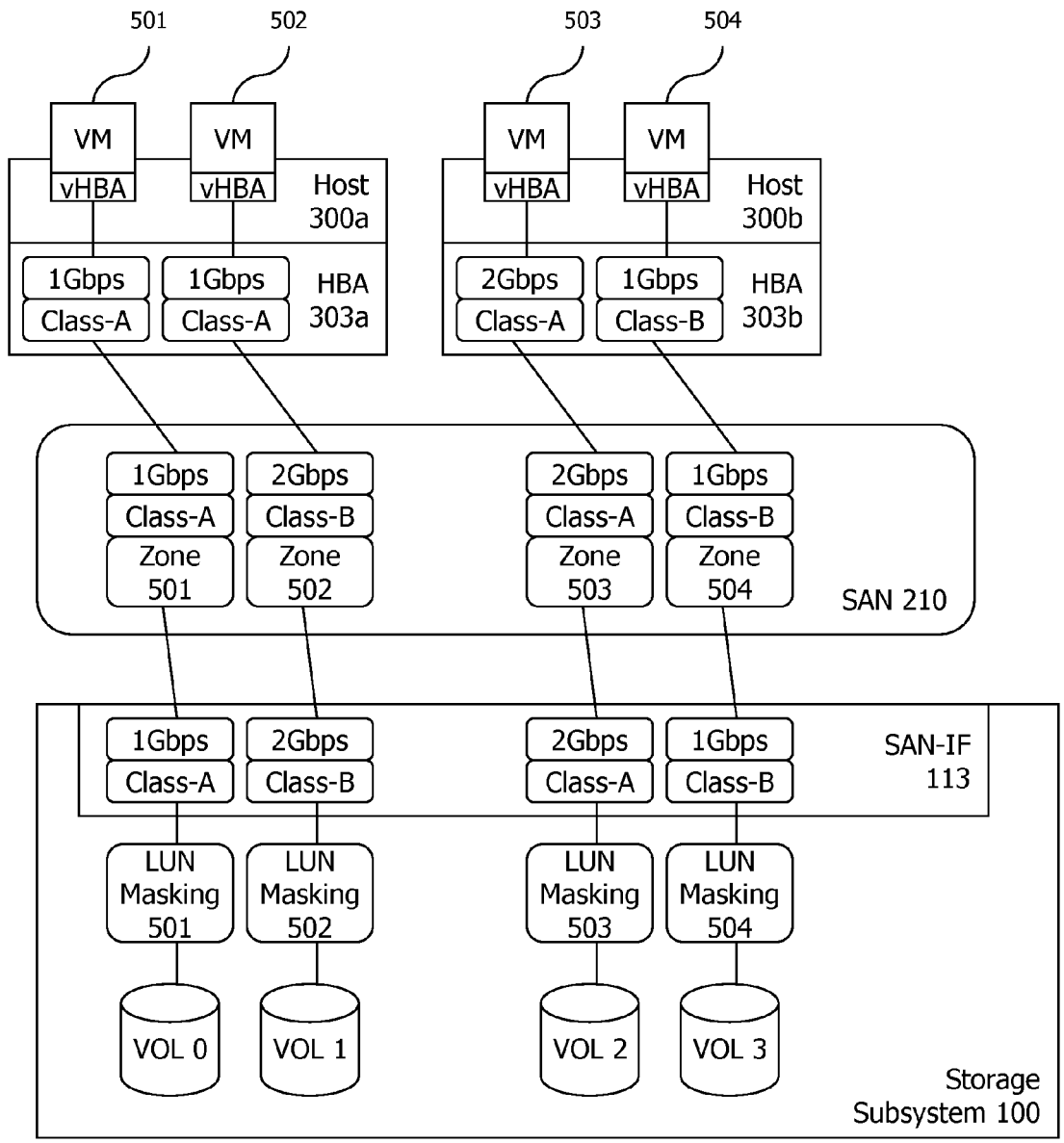
Fig.9 Example of I/O Path Configuration using Virtual HBA

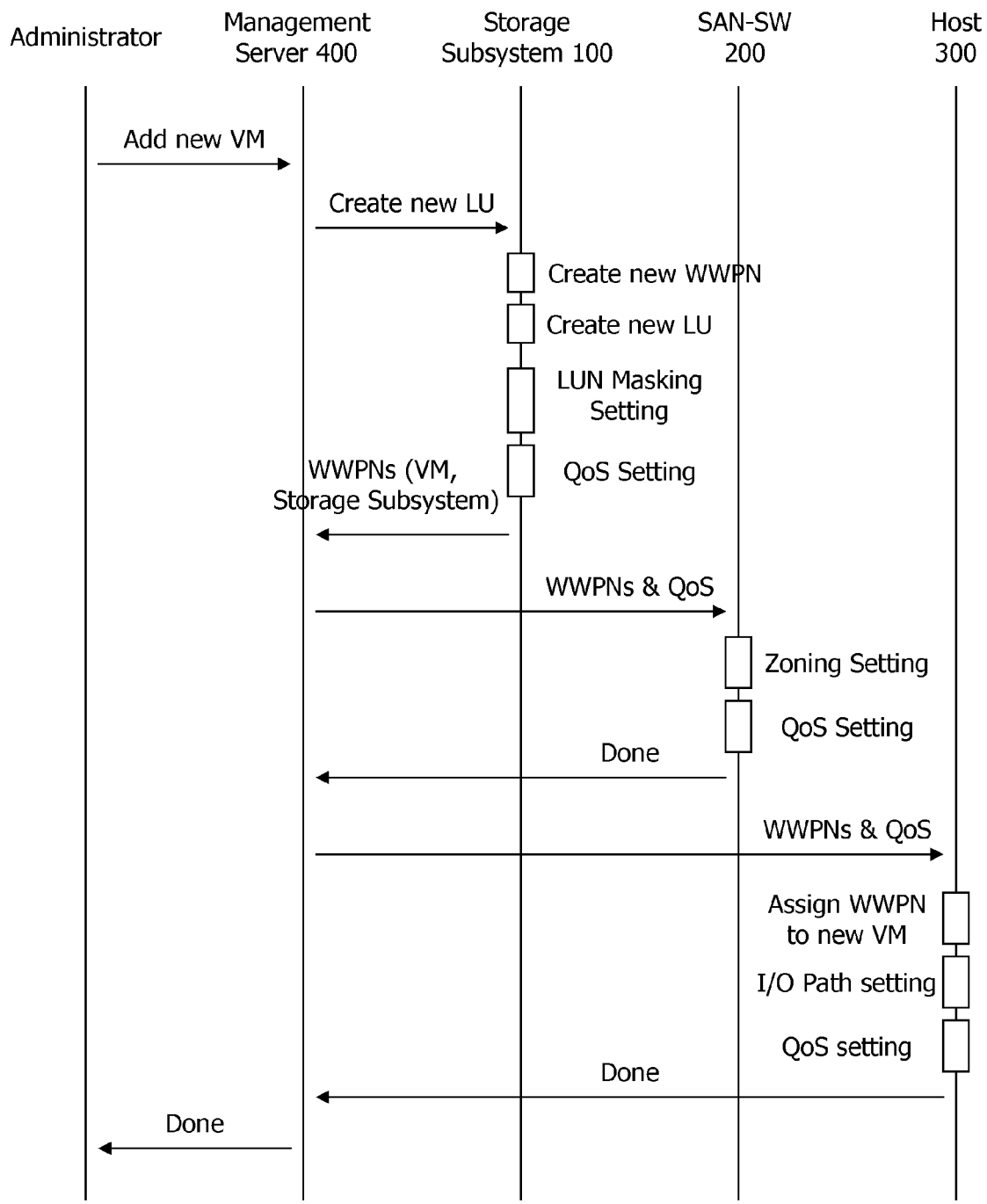
Fig.10 Procedure of adding new VM

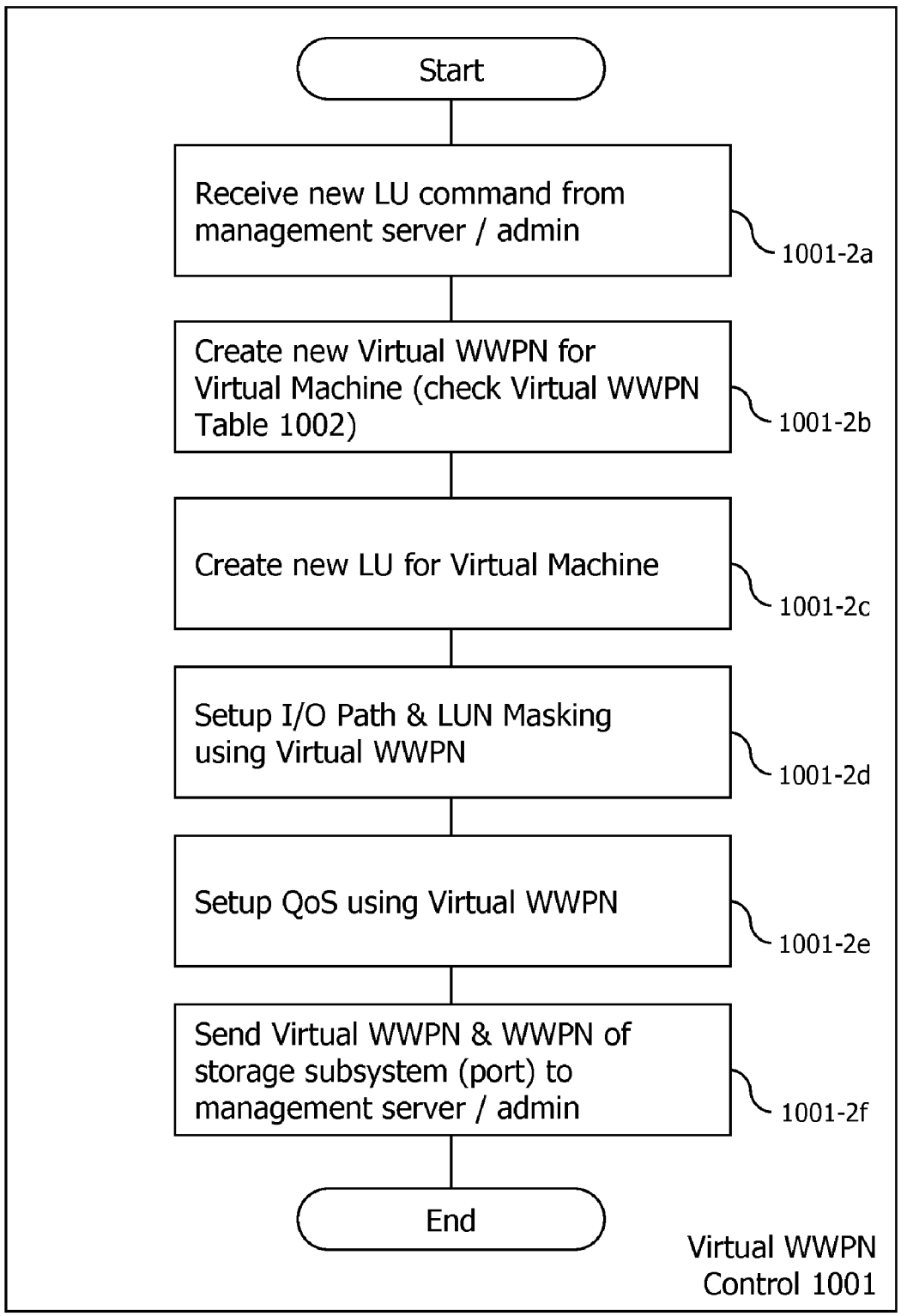
Fig.11 Flowchart of Virtual WWPN Control

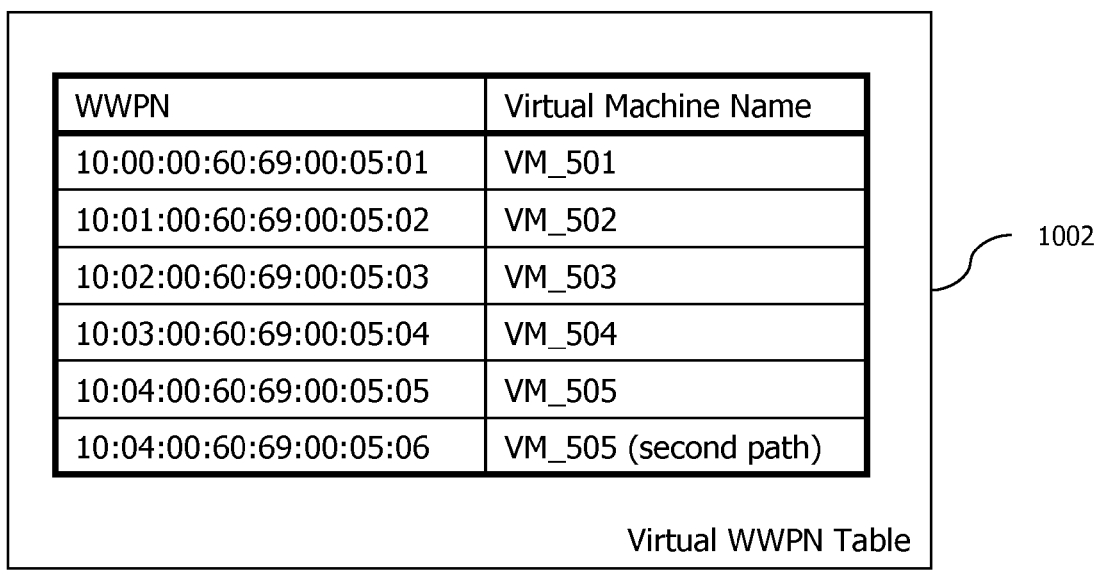
Fig.12 Example of Virtual WWPN Table

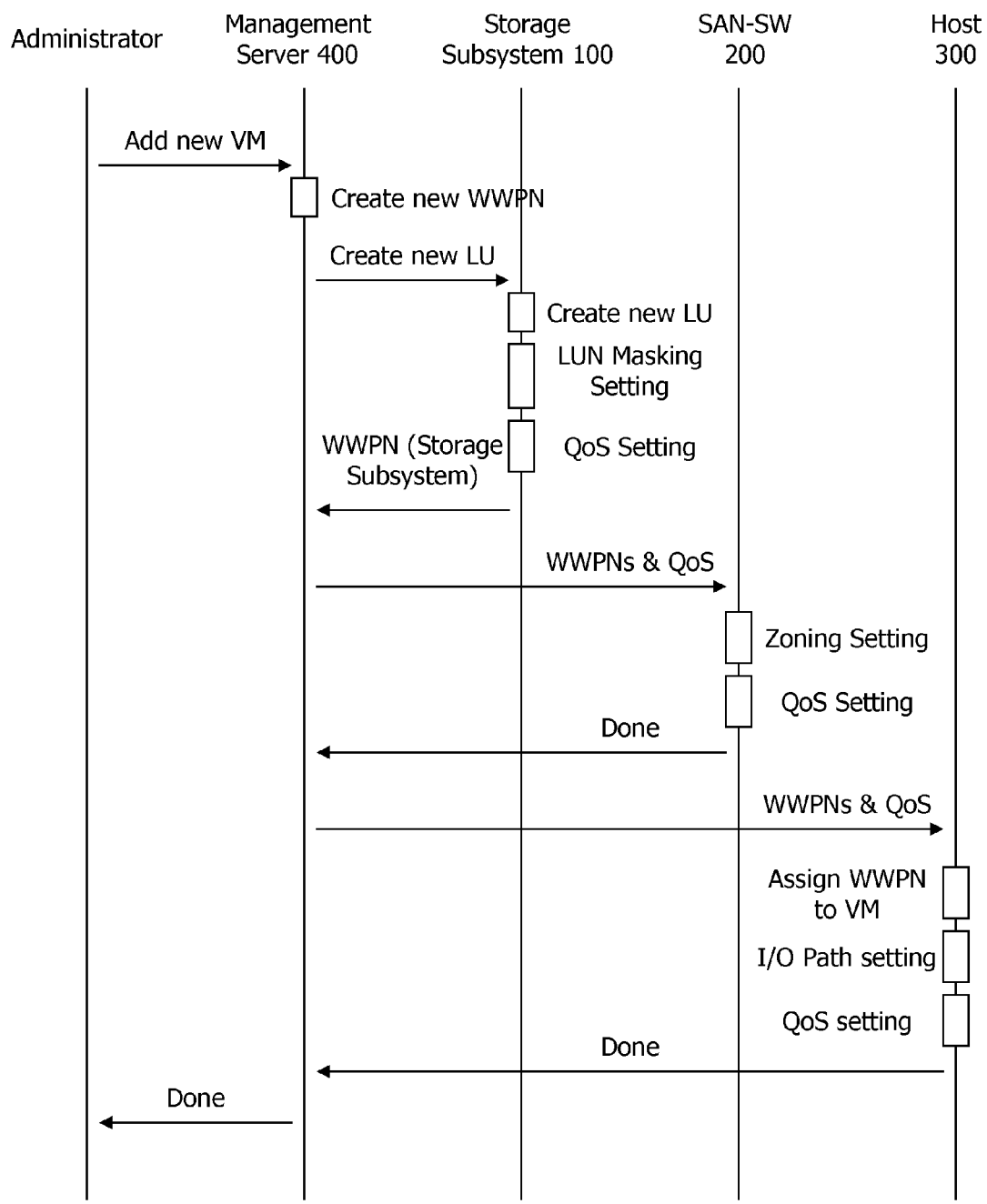
Fig.13 Procedure of adding new VM

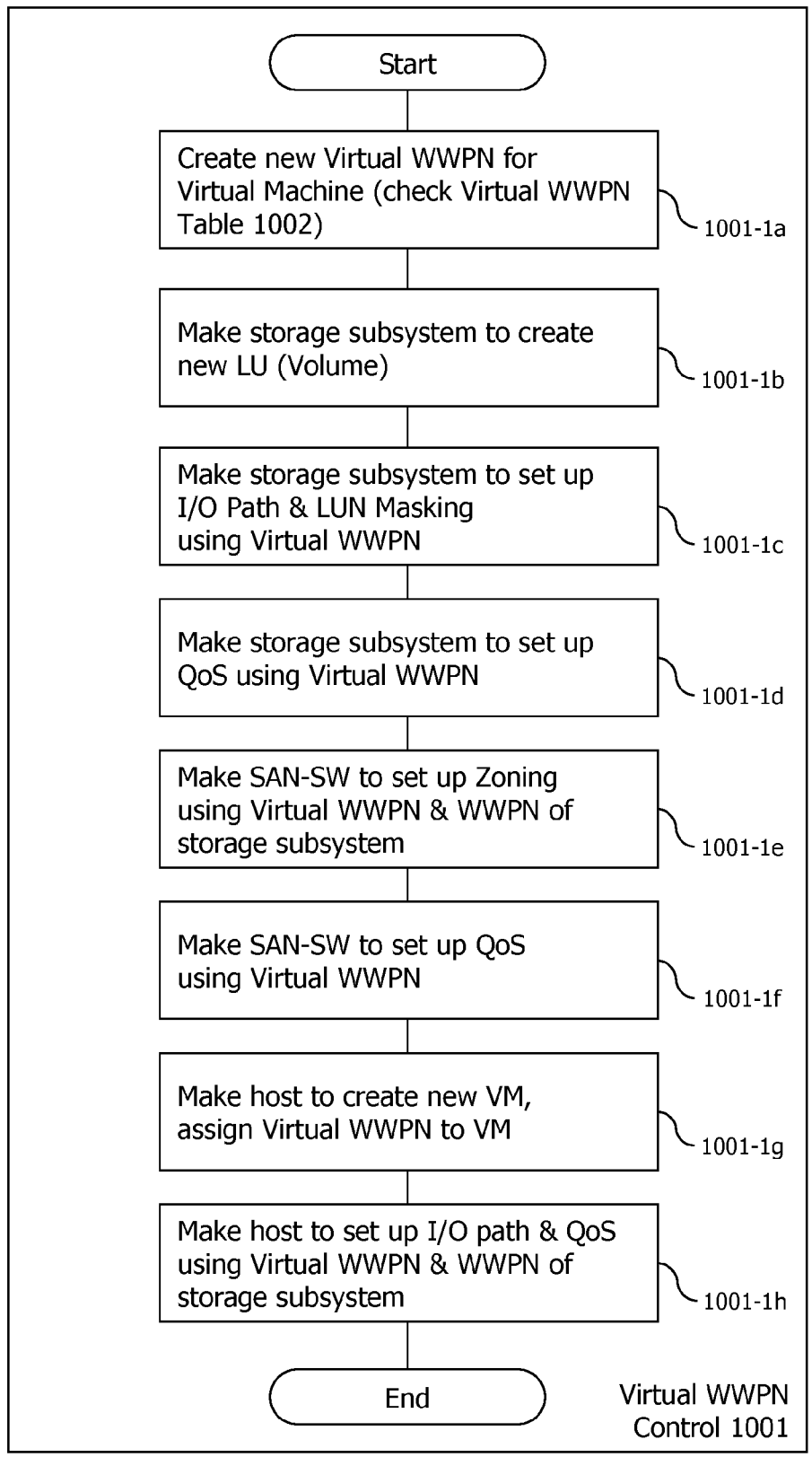
Fig.14 Flowchart of Virtual WWPN Control

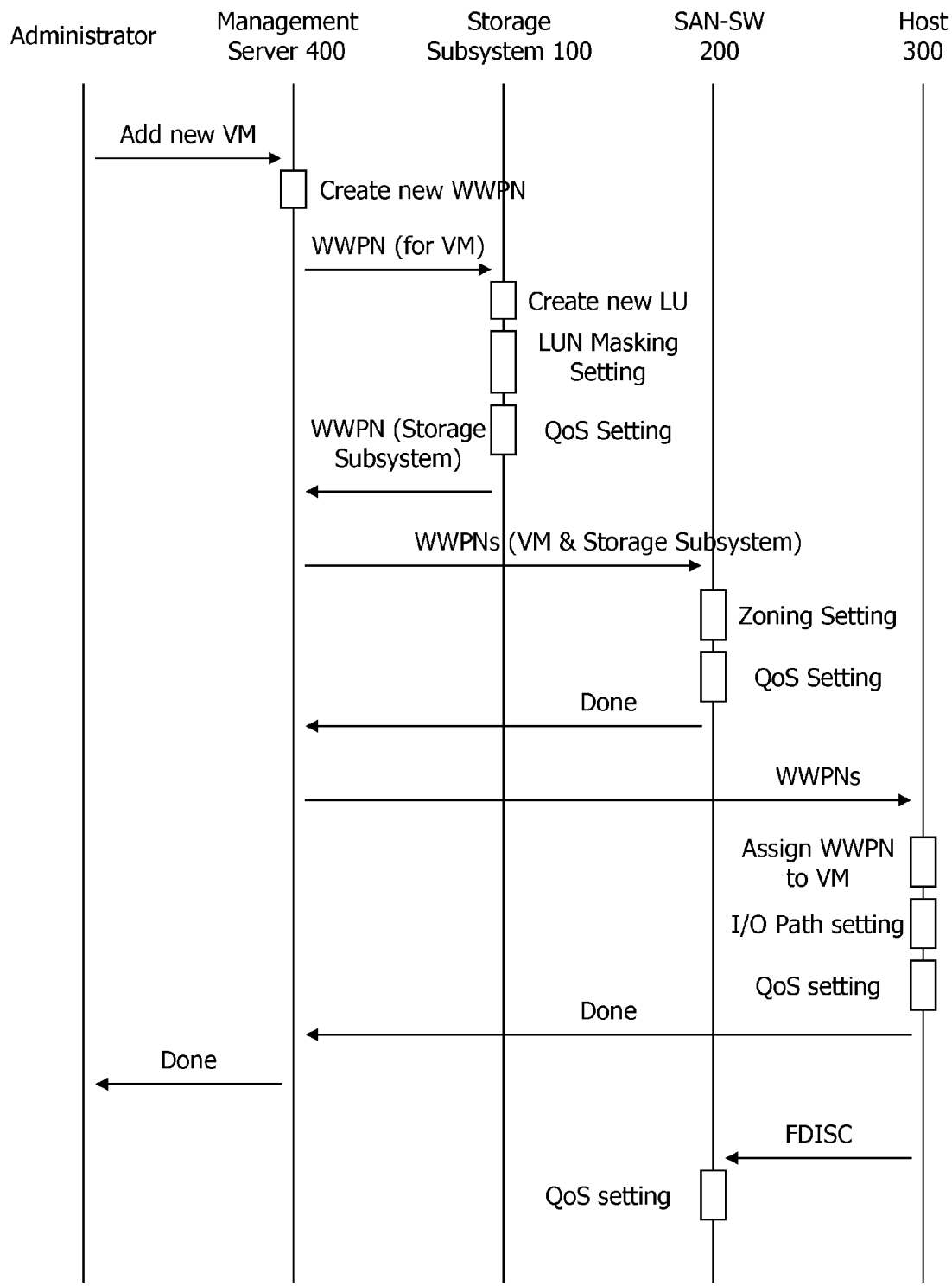
Fig.15 Procedure of adding new VM

| Command ID (part of WWPN) | Action | | |
|---|---|---|---|
| | VOL size | Band width | Class |
| 10:00 | 20GB | 1Gbps | A |
| 10:01 | 20GB | 2Gbps | B |
| 10:02 | 20GB | 2Gbps | A |
| 10:03 | 20GB | 1Gbps | B |
| 10:04 | 50GB | 500Mbps | C |

1004

Command Table

Fig.16 Example of Command Table

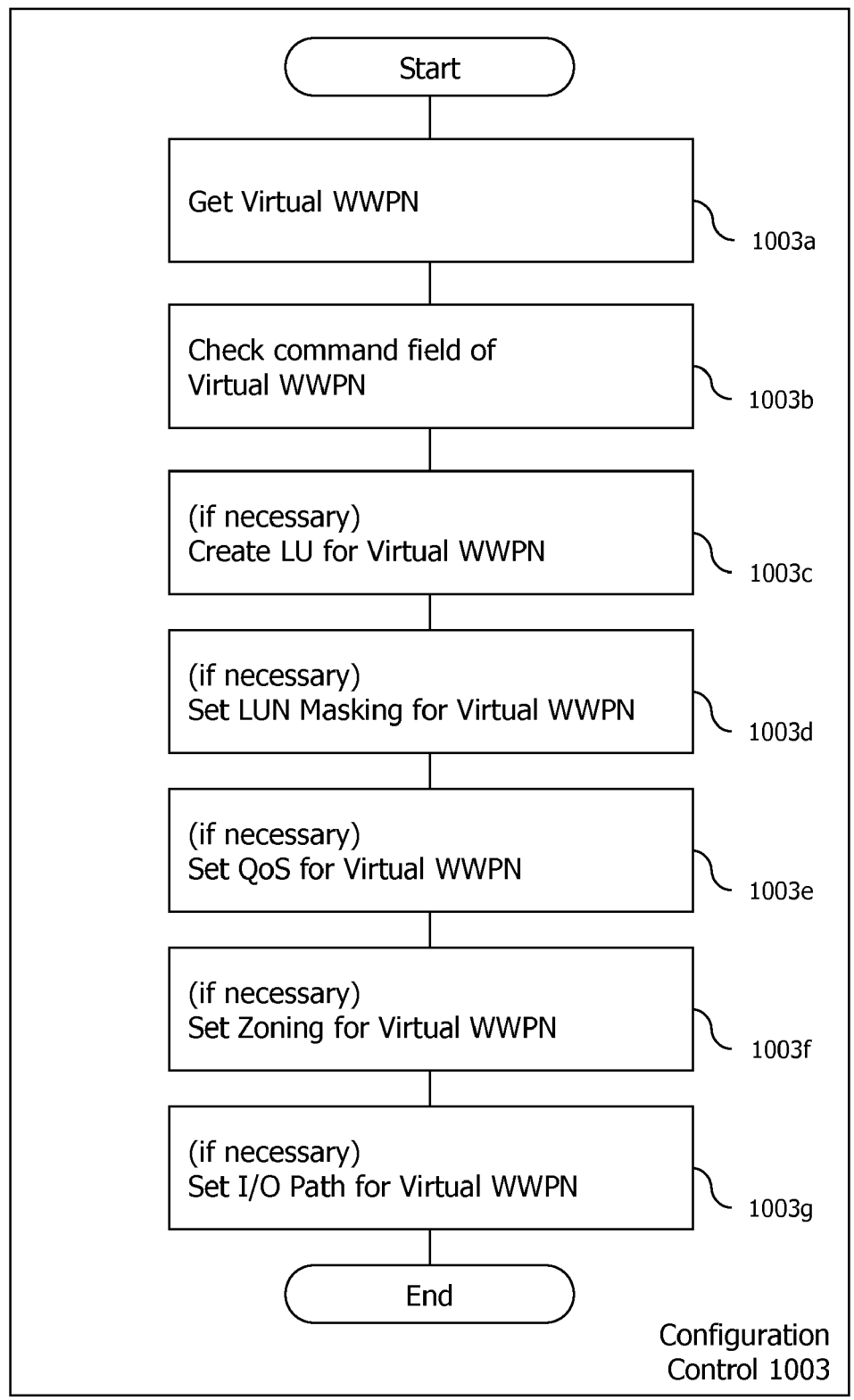
Fig.17 Flowchart of Configuration Control

METHOD AND APPARATUS FOR RESOURCE PROVISIONING

BACKGROUND OF THE INVENTION

The present invention relates generally to storage systems and, more particularly, to resource provisioning, especially for virtual machine (VM) involving server virtualization technology and storage area network (SAN).

Server virtualization technology allows the system administrator to deploy a number of virtual server instances or virtual machines (VM) on a single physical server. These VMs connect to a storage subsystem via SAN in order to access one or more storage volumes in the storage subsystem. Server virtualization allows the system administrator to deploy server instance as VM in a short term or time frame, because they do not need to install a physical device to deploy the server instance. As a result, the situation arises in which a customer tends to require the system administrator to deploy a lot of VMs in a very short term.

System administrators who manage a server virtualization environment have to provision proper resources (including, e.g., CPU, memory, I/O bandwidth, QoS, storage volume, and the like) to many VMs, SANs, and storage subsystems as fast as the customers demand.

Today, Fibre Channel (FC) is the most popular protocol for SAN. FC uses WWN (World Wide Name) to identify each node on the SAN (host computer, storage subsystem). Each node has an HBA (Host Bus Adapter) connected to the SAN, and each HBA has a unique WWPN (World Wide Port Name). The connection between a host computer and a storage subsystem is established by using each WWPN. The host computer also uses WWPN to identify each storage subsystem to which the host computer wants to connect.

In order to provision resources end to end (VM~SAN~storage subsystem), each VM has its own WWPN. NPIV (N_Port ID Virtualization) technology allows the HBA of the VM to have a virtual WWPN. The virtual WWPN is not a static, physical identifier like WWPN on the physical HBA. Instead, the system administrator can create a virtual WWPN and assign it to a physical HBA and virtual WWPN can be moved onto another physical HBA.

Using current solutions, the host side components (hypervisor, host OS or HBA) will create a virtual WWPN for each VM when a new VM creation occurs. After virtual WWPN creation, the system administrator can set up the SAN (zoning, QoS, etc.) and the storage subsystem (LUN Masking, QoS, etc.). This involves the following steps:
1) Create new VM
2) Create new virtual WWPN for VM
3) Setup SAN
4) Setup storage subsystem
5) Start VM SAN and storage subsystem setup have to be done before starting VM and after virtual WWPN creation. The above approach of current solutions requires the system administrator to touch host side components at least twice. This is not an efficient way to complete the required amount of resource provisioning in a short term for the VM~SAN~storage subsystem environment using NPIV. Additionally, if there are plural hosts, there is no method to detect duplicate virtual WWPN creation. Significantly, duplicated virtual WWPN is not allowed into SAN.

BRIEF SUMMARY OF THE INVENTION

Embodiments of the invention provide a method and apparatus for resource provisioning on the VM~SAN~storage subsystem environment using NPIV. VM (Virtual Machine) such as server virtualization technology and SAN (Storage Area Network). To create the new VM, either the management server or the storage subsystem creates a new virtual WWPN for the new VM. The storage subsystem provides a new LU for the new VM. The computer device assigns the new virtual WWPN to the new VM.

In accordance with an aspect of the present invention, a computer system comprises at least one storage subsystem and a computer device which are connected via a network. The computer device is configured to provide one or more virtual machines. Upon receiving information on a new virtual machine to be provided in the computer device, a first storage subsystem of the at least one storage subsystem creates a unique virtual port name for the new virtual machine and provides a volume for the new virtual machine. The first storage subsystem includes a unique port name for a port through which the volume for the new virtual machine has I/O connection via the network. The computer device receives the unique virtual port name for the new virtual machine and assigns the unique virtual port name to the new virtual machine under NPIV (N_Port ID Virtualization).

In some embodiments, the storage subsystem provides a logical unit (LU) as the volume for the virtual machine, and configures I/O path, LUN masking, and QoS setting using the unique virtual port name for the new virtual machine. The network is a SAN (storage area network), and configures zoning and QoS setting using the unique virtual port name for the new virtual machine and the unique port name for the port of the first storage subsystem. The computer device configures I/O path and QoS setting using the unique virtual port name for the new virtual machine and the unique port name for the port of the first storage subsystem. The first storage subsystem includes a virtual port name table for storing the unique virtual port name of each virtual machine to be checked in creating a new virtual port name to avoid duplication.

In accordance with another aspect of the invention, a computer system comprises at least one storage subsystem, a computer device, and a storage management server which are connected via a network. The computer device is configured to provide one or more virtual machines. Upon receiving information on a new virtual machine to be provided in the computer device, one of a first storage subsystem of the at least one storage subsystem or the storage management server creates a unique virtual port name for the new virtual machine and the first storage subsystem provides a volume for the new virtual machine. The first storage subsystem includes a unique port name for a port through which the volume for the new virtual machine has I/O connection via the network. The computer device receives the unique virtual port name for the new virtual machine and assigns the unique virtual port name to the new virtual machine under NPIV (N_Port ID Virtualization).

In some embodiments, the first storage subsystem provides a logical unit (LU) as the volume for the virtual machine, and configures I/O path, LUN masking, and QoS setting using the unique virtual port name for the new virtual machine. The network is a SAN (storage area network), and configures zoning and QoS setting using the unique virtual port name for the new virtual machine and the unique port name for the port of the first storage subsystem. The computer device configures I/O path and QoS setting using the unique virtual port name for the new virtual machine and the unique port name for the port of the first storage subsystem. The first storage subsystem creates the unique virtual port name for the new virtual machine, and includes a virtual port name table for storing the unique virtual port name of each virtual machine to be checked in creating a new virtual port name to avoid duplication. The storage management server includes a consolidated virtual port name table for storing the unique virtual port name of each virtual machine from all of the at least one storage subsystem to be checked in creating a new virtual port name to avoid duplication.

In specific embodiments, the storage management server creates the unique virtual port name for the new virtual machine, and includes a virtual port name table for storing the unique virtual port name of each virtual machine to be checked in creating a new virtual port name to avoid duplication. The unique virtual port name for the new virtual machine includes a set up command. The at least one storage subsystem, the computer device, and the network configure themselves based on the set up command.

In a computer system having at least one storage subsystem, a computer device, and a storage management server which are connected via a network, another aspect of the invention is directed to a method of resource provisioning for a new virtual machine to be provided in the computer device. The method comprises creating a unique virtual port name for the new virtual machine by one of a first storage subsystem of the at least one storage subsystem or the storage management server; providing a volume for the new virtual machine in the first storage subsystem, the first storage subsystem including a unique port name for a port through which the volume for the new virtual machine has I/O connection via the network; and assigning the unique virtual port name to the new virtual machine in the computer device under NPIV (N_Port ID Virtualization).

In some embodiments, providing the volume comprises providing a logical unit (LU) as the volume in the first storage subsystem for the virtual machine, and the method further comprises configuring I/O path, LUN masking, and QoS setting in the first storage subsystem using the unique virtual port name for the new virtual machine. The network is a SAN (storage area network), and the method further comprises configuring zoning and QoS setting in the SAN using the unique virtual port name for the new virtual machine and the unique port name for the port of the first storage subsystem. The method further comprises configuring I/O path and QoS setting in the computer device using the unique virtual port name for the new virtual machine and the unique port name for the port of the first storage subsystem.

In one specific embodiment, a computer system comprises a storage subsystem, a host computer, a SAN (including one or more SAN-SWs), and a storage management server. In order to create a new VM in the host computer, the storage management server creates new virtual WWPN for the new VM at first. Next, the storage management server provides the virtual WWPN to the storage subsystem and directs the storage subsystem to create a new LU (If there is available LU(s) for the new VM, it does not have to create a new LU). The storage subsystem assigns the LU to its WWPN (port) and sets up LUN masking and QoS setting. The storage subsystem provides its WWPN to the storage management server, and the storage management server directs the SAN-SW to set up zoning and QoS by providing to it the virtual WWPN for the new VM and the WWPN of the storage subsystem port. Finally, the storage management server directs the host computer to create the new VM and set up I/O path and QoS by providing to it the virtual WWPN for the new VM and the WWPN of the storage subsystem port.

In another specific embodiment, the computer system comprises a storage subsystem, a host computer, a SAN (including one or more SAN-SWs), and a storage management server. In order to create a new VM in the host computer, the storage management server directs the storage subsystem to create a new LU. The storage subsystem creates a new LU (If there is available LU(s) for the new VM, it does not have to create a new LU), and a new virtual WWPN for the new VM. The storage subsystem assigns the LU to its WWPN (port) and sets up LUN masking and QoS setting. The storage subsystem provides the virtual WWPN for the VM and its WWPN to the storage management server, and the storage management server directs the SAN-SW to set up zoning and QoS by providing the virtual WWPN for the VM and the WWPN of the storage subsystem port. Finally, the storage management server directs the host computer to create the new VM and set up I/O path and QoS by providing to it the virtual WWPN for the VM and the WWPN of the storage subsystem port.

These and other features and advantages of the present invention will become apparent to those of ordinary skill in the art in view of the following detailed description of the specific embodiments.

BRIEF DESCRIPTION OF THE DRAWINGS

FIG. 1 illustrates an example of a hardware configuration in which the method and apparatus of the invention may be applied.

FIG. 2 shows a software module configuration of the memory in the storage subsystem of FIG. 1.

FIG. 3 shows an example of the configuration of the SAN-SW of FIG. 1.

FIG. 4 shows an example of the configuration of the host of FIG. 1.

FIG. 5 shows an example of the configuration of the management server of FIG. 1.

FIG. 6 shows an example of the logical volume management table in the memory of the storage subsystem of FIG. 2.

FIG. 7 shows an example of the QoS table in the memory of the storage subsystem of FIG. 2.

FIG. 8 shows an example of the zoning table of the SAN-SW of FIG. 3.

FIG. 9 illustrates an example of the I/O Path configuration using NPIV.

FIG. 10 shows an example of the provisioning procedure in which the virtual WWPN of the VM is created by the storage subsystem according to a first embodiment of the invention.

FIG. 11 shows an example of the process flow of virtual WWPN control on the storage subsystem in the provisioning procedure of FIG. 10.

FIG. 12 shows an example of a virtual WWPN table.

FIG. 13 shows an example of the provisioning procedure in which the virtual WWPN of the VM is created by the management server according to a second embodiment of the invention.

FIG. 14 shows an example of the process flow of virtual WWPN control on the management server in the provisioning procedure of FIG. 13.

FIG. 15 shows an example of the provisioning procedure in which the virtual WWPN of the VM has configuration command for the storage subsystem, the SAN-SW, and the host according to a third embodiment of the invention.

FIG. 16 shows an example of a command table.

FIG. 17 shows an example of the process flow of configuration control in the provisioning procedure of FIG. 15.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Embodiments of the invention, as will be described in greater detail below, provide apparatuses, methods and computer programs for resource provisioning on the VM~SAN~storage subsystem environment using NPIV.

1. System Structure

FIG. 1 illustrates an example of a hardware configuration in which the method and apparatus of the invention may be applied. The system includes a storage subsystem 100, a SAN-SW 200, a host computer 300, and a storage management server 400.

The storage subsystem 100 has a storage controller 110 and a disk unit 120. The storage controller 110 includes a CPU 111, a memory 112, a SAN I/F 113 for interfacing with the SAN-SW 200, a disk I/F 114 for interfacing with the disk unit 120, and an Ether I/F 115 for interfacing with a network such as a LAN that is coupled with the SAN-SW 200, the host computer 300, and the management server 400. The storage controller 110 performs disk I/O functionality with the host computer 300 using Fibre Channel Protocol via the SAN-SW 200. The disk unit 120 has a plurality of hard disk drives (HDD) 121. The storage controller combines these HDDs and configures the RAID (Redundant Arrays of Inexpensive Disks), and then provides a volume (LU: Logical Unit) to the host computer 300. These functions are executed by application programs shown in FIG. 2 and FIG. 6 (including logical volume I/O control, physical disk control, and so on).

FIG. 2 shows a software module configuration of the memory 112 in the storage subsystem 100. The memory 112 includes logical volume I/O control 112-01, physical disk control 112-02, flush/cache control 112-03, logical volume management table 112-04, RAID management table 112-05, I/O control 112-06, virtual WWPN control 1001, virtual WWPN table 1002, configuration control 1003, command table 1004, and QoS table 1005. FIG. 6 shows an example of the logical volume management table 112-04.

FIG. 3 shows an example of the configuration of the SAN-SW 200. The SAN-SW 200 has a CPU 201, a memory 202, and SAN interfaces including SAN I/F 203 (203a, 203b, etc.) as represented by Fibre Channel Interfaces and Ethernet Interface 204 (when using FC over Ethernet). Each SAN interface connects to other devices such as the storage subsystem 100, the host computer 400, and other SAN-SWs 200. One or more SAN-SWs make up the Storage Area Network (SAN). In the embodiment shown, the memory 202 includes operating system 202-01, frame forwarding module 202-02, frame forwarding table 202-03, name server module 202-04, zoning table 202-05, virtual WWPN control 1001, virtual WWPN table 1002, configuration control 1003, command table 1004, and QoS table 1005.

FIG. 4 shows an example of the configuration of the host computer 300. The host computer 300 connects to the SAN-SW 200. The host computer 300 includes a CPU 301, a memory 302, an HBA 303, and an Ether I/F 304 for interfacing with the network such as the LAN. The memory 302 includes operating system 302-01, hypervisor for virtual machine 302-02, I/O control 302-03, storage path management table 302-04, configuration control 1003, command table 1004, and QoS table 1005. The hypervisor program for virtual machine enables the physical host computer 300 to run multiple virtual server machine images (VM). Each VM has I/O connections to the storage subsystem 100.

FIG. 5 shows an example of the configuration of the storage management server 400. The management server 400 includes a CPU 401, a memory 402, and an Ether I/F 403. Through the Ether I/F 403, the management server 400 connects to the storage subsystem 100, the SAN-SW 200, and the host computer 300 via the LAN to control them. The memory 402 includes operating system 402-01, migration control 402-02, virtual WWPN control 1001, virtual WWPN table 1002, and command table 1004. In this case, each VM on the host computer 300 has a virtual HBA using NPIV technology and has an I/O connection to the storage subsystem 100.

FIG. 6 shows an example of the logical volume management table 112-04 in the memory 112 of the storage subsystem 100 of FIG. 2. The table 112-04 includes columns of the initiator WWPN, the target WWPN, the LUN, and the volume number. The storage subsystem 100 can control I/O connection with each VM using this table. For instance, the WWPN of the host 300 is allowed to access the WWPN of the storage subsystem 100 and the LUN. Generally, this I/O path control is referred to as LUN Masking.

Without NPIV, there is no way for the SAN-SW 200 to identify which I/O connection belongs to a specific VM. When using NPIV, the system administrator can assign each (I/O connection of) VM with a specific network resource such as bandwidth, QoS, and zoning. FIG. 7 shows an example of the QoS table 1005 on the SAN-SW 200 of FIG. 3. The SAN-SW 200 can identify each I/O connection (of VM) using the WWPN and set the desired bandwidth and class of service. FIG. 8 shows an example of the zoning table 202-05 on the SAN-SW 200 of FIG. 3. The zoning table 202-05 includes columns of the zoning name and the member that can define private access domain using the WWPN of the VM and the storage subsystem 100.

FIG. 9 shows an example of I/O path configuration using NPIV. Two VMs 501, 502 are provided on the host computer 300a, and have 1 Gbps bandwidth and Class-A. Two VMs 503, 504 are provided on the host computer 300b. The VM 503 has 2 Gbps bandwidth and Class-A, while the VM 504 has 1 Gbps bandwidth and Class-B. Each VM has a virtual HBA with a WWPN. The four VMs 501-504 on the host computers 300a, 300b have I/O connections to four volumes (VOL 0, VOL 1, VOL 2, and VOL 4) in the storage subsystem 100 via the SAN 210. The SAN 210 includes one or more SAN-SWs 200. The SAN 210 connects the VMs 501-504 and the storage subsystem 100, and assigns network resources and zoning with I/O connection of each VM using the WWPN on the virtual HBA. In addition, the storage subsystem 100 as well as the host computers 300a, 300b can also assign network resources (and LUN Masking) with I/O connection of each VM using the WWPN on the virtual HBA.

2. Provisioning Method A: Virtual WWPN Created by Storage Subsystem 100

FIG. 10 shows an example of the provisioning procedure for adding a new VM in which the virtual WWPN of the VM is created by the storage subsystem 100 according to a first embodiment of the invention. At first, the system administrator operates the management server 400 to add the new VM. The management server 400 directs the storage subsystem 100 to create the new LU for the new VM. The storage subsystem 100 creates a new virtual WWPN for the new VM and creates a new LU for the new VM (If there is available LU(s) for the new VM, however, the storage subsystem 100 does not have to create another new LU). The storage subsystem 100 then configures the LUN masking and QoS setting using the new virtual WWPN, sends the virtual WWPN and the WWPN of the storage subsystem port which is the SAN I/F 113 for the access to the new LU for the new VM. This information allows the SAN-SW 200 and the host computer 300 to configure the zoning and I/O path setting. The management server 400 directs the SAN-SW 200 to configure the zoning and QoS using the virtual WWPN for the new VM and the WWPN of the access port of the storage subsystem 100. The management server 400 further directs the host computer 300 to assign the virtual WWPN to the new VM, and to configure the I/O path and QoS setting using the virtual WWPN and the WWPN of the access port of the storage subsystem 100.

FIG. 11 shows an example of the process flow of virtual WWPN control 1001 on the storage subsystem 100 in the provisioning procedure of FIG. 10. It includes creating the new virtual WWPN for the new VM. In step 1001-2a, the program receives a new LU command from the management server 400 or administrator. In step 1001-2b, the program creates a new virtual WWPN for the virtual machine by checking the virtual WWPN table 1002 to avoid duplication. FIG. 12 shows an example of the virtual WWPN table 1002. When a new virtual WWPN is created by the virtual WWPN control 1001, it will be recorded to the virtual WWPN table 1002 to check for any duplicate virtual WWPN. This prevents the creation of duplicate virtual WWPN by the virtual WWPN control 1001.

In step 1001-2c of FIG. 11, the program creates or provides a new LU for the virtual machine. The program then sets up the I/O path and LUN masking using the virtual WWPN in step 1001-2d, and sets up the QoS using the virtual WWPN in step 1001-2e. In step 1001-2f, the program sends the virtual WWPN and the WWPN of the access port of the storage subsystem 100 to the management server 400 or administrator.

3. Provisioning Method B: Virtual WWPN Created by Management Server 400

FIG. 13 shows an example of the provisioning procedure in which the virtual WWPN of the VM is created by the storage management server 400 according to a second embodiment of the invention. At first, the system administrator operates the management server 400 and adds a new VM. The management server 400 creates a new Virtual WWPN for the new VM and directs the storage subsystem 100 to create the new LU for the new VM (If there is available LU(s) for the new VM, however, the storage subsystem 100 does not have to create another new LU). At this time, the management server 400 provides the new Virtual WWPN to the storage subsystem 100. This information allows the storage subsystem 100 to configure the LUN Masking and QoS setting. The storage subsystem 100 sends to the management server 400 the WWPN of the storage subsystem port which is the SAN I/F 113 for the access to the new LU. This information allows the SAN-SW 200 and the host computer 300 to configure the zoning and I/O path setting. The management server 400 directs the SAN-SW 200 to configure the zoning and QoS using the virtual WWPN for the new VM and the WWPN of the access port of the storage subsystem 100. The management server 400 further directs the host computer 300 to assign the virtual WWPN to the new VM, and to configure the I/O path and QoS setting using the virtual WWPN and the WWPN of the access port of the storage subsystem 100.

FIG. 14 shows an example of the process flow of the virtual WWPN control 1001 on the management server 400 in the provisioning procedure of FIG. 13. In step 1001-1a, the program creates a new virtual WWPN for the new virtual machine by checking the virtual WWPN table 1002 to avoid duplication. In step 1001-1b, the program directs the storage subsystem 100 to create or provide the new LU for the new VM. The program further directs the storage subsystem 100 to set up the I/O path and LUN masking using the virtual WWPN in step 1001-1c, and to set up the QoS using the virtual WWPN in step 1001-1d. In step 1001-1e, the program directs the SAN-SW 200 to set up the zoning using the virtual WWPN and the WWPN of the access port of the storage subsystem 100. In step 1001-1f, the program directs the SAN-SW 200 to set up the QoS using the virtual WWPN. The program directs the host computer 300 to create the new VM and assign the virtual WWPN to the new VM in step 1001-1g, and to set up the I/O path and QoS using the virtual WWPN and the WWPN of the access port of the storage subsystem 100 in step 1001-1h.

4. Provisioning Method—C: Virtual WWPN has Configuration Command

FIG. 15 shows an example of the provisioning procedure in which the virtual WWPN of the VM has configuration command for the storage subsystem 100, the SAN-SW 200, and the host computer 300 according to a third embodiment of the invention. The virtual WWPN for the new VM will be created by the virtual WWPN control 1001 on the management server 400. In this case, the virtual WWPN has the information which represents set up command for the storage subsystem 100, the SAN-SW 200, and the host computer 300. For instance, the virtual WWPN control 1001 on the management server 400 creates the virtual WWPN with the set up command.

In FIG. 15, the system administrator operates the management server 400 and adds a new VM. The management server 400 creates a new Virtual WWPN for the new VM and directs the storage subsystem 100 to create the new LU for the new VM (If there is available LU(s) for the new VM, however, the storage subsystem 100 does not have to create another new LU). At this time, the management server 400 provides the new Virtual WWPN to the storage subsystem 100. This information allows the storage subsystem 100 to configure the LUN Masking and QoS setting. The storage subsystem 100 sends to the management server 400 the WWPN of the storage subsystem port which is the SAN I/F 113 for the access to the new LU. This information allows the SAN-SW 200 and the host computer 300 to configure the zoning and I/O path setting. The management server 400 directs the SAN-SW 200 to configure the zoning and QoS using the virtual WWPN for the new VM and the WWPN of the access port of the storage subsystem 100. The management server 400 further directs the host computer 300 to assign the virtual WWPN to the new VM, and to configure the I/O path and QoS setting using the virtual WWPN and the WWPN of the access port of the storage subsystem 100. In addition, the host computer 300 provides its WWPN to the SAN-SW 200 in a FDISC step, and the SAN-SW 200 sets up the QoS.

FIG. 16 shows an example of a command table 1004. The command ID is part of the virtual WWPN, and includes under the action column the volume size, bandwidth, and class to be used for the set up procedures. If the beginning of the virtual WWPN is "10:00," the set up command (action) will be "create new 20 GB LU/VOL", "set I/O band width as 1 Gbps" and "set Class of service as 'A'." When the devices (i.e., the storage subsystem 100, the SAN-SW 200, and the host computer 300) receive this virtual WWPN, they configure themselves by referring to the command table 1004 (executed by the configuration control 1003 in each of the devices as seen in FIG. 17). The command table 1004 can be stored in each of the storage subsystem 100, the host computer 300, and the management server 400.

FIG. 17 shows an example of the process flow of configuration control 1003 in the provisioning procedure of FIG. 15. For each device, the configuration control program 1003 gets the virtual WWPN in step 1003a, and checks the command field of the virtual WWPN in step 1003b. If necessary, the program creates the LU for the virtual WWPN in step 1003c, sets the LUN masking for the virtual WWPN in step 1003d, sets the QoS for the virtual WWPN in step 1003e, sets the zoning for the virtual WWPN in step 1003f, and sets the I/O path for the virtual WWPN in step 1003g.

In the first embodiment described above, the storage subsystem 100 performs the virtual WWPN creation function and stores the virtual WWPN table 1002. There is no need for a management server to perform these functions. The storage subsystem 100 can consolidate a plurality of VMs. In the second embodiment above, the management server 400 performs the virtual WWPN creation function and stores the virtual WWPN table 1002. In this way, the storage subsystem 100 does not need to perform these additional functions, and the system may include one or more general purpose storage subsystems. This approach can be used for the third embodiment described above.

In yet another embodiment, the storage subsystem 100 performs the virtual WWPN creation function and stores the virtual WWPN table 1002, while a consolidated virtual WWPN table 1002 is stored on the management server 400. This prevents duplicated virtual WWPN in the multiple storage subsystems environment. In this embodiment, all the storage subsystems are configured to perform special functions of creating virtual WWPN and storing virtual WWPN tables. As a result, it is easier to manage than the case where the second embodiment includes a plurality of general purpose storage subsystems.

From the foregoing, it will be apparent that the invention provides methods, apparatuses and programs stored on computer readable media for VM storage resource provisioning in the NPIV environment. It allows the system administrator to execute efficient operation and prevent duplicated virtual WWPN using NPIV. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A computer system comprising:
at least one storage subsystem and a computer device which are connected via a network;
wherein the computer device is configured to provide one or more virtual machines;
wherein upon receiving information on a new virtual machine to be provided in the computer device, a first storage subsystem of the at least one storage subsystem creates a unique virtual port name for the new virtual machine and provides a volume for the new virtual machine, the first storage subsystem including a unique port name for a port through which the volume for the new virtual machine has I/O (Input/Output) connection via the network;
wherein the computer device receives the unique virtual port name for the new virtual machine and assigns the unique virtual port name to the new virtual machine under NPIV (N_Port ID Virtualization); and
wherein QoS (Quality of Service) setting between the computer device and the first storage subsystem is configured using the unique virtual port name for the new virtual machine.

2. A computer system according to claim 1,
wherein the first storage subsystem provides a logical unit (LU) as the volume for the virtual machine, and configures I/O path, LUN (Logical Unit Number) masking, and QoS setting using the unique virtual port name for the new virtual machine.

3. A computer system according to claim 1,
wherein the network is a SAN (storage area network), and configures zoning and QoS setting using the unique virtual port name for the new virtual machine and the unique port name for the port of the first storage subsystem.

4. A computer system according to claim 1,
wherein the computer device configures I/O path and QoS setting using the unique virtual port name for the new virtual machine and the unique port name for the port of the first storage subsystem.

5. A computer system according to claim 1,
wherein the first storage subsystem includes a virtual port name table for storing the unique virtual port name of each virtual machine to be checked in creating a new virtual port name to avoid duplication.

6. A computer system comprising:
at least one storage subsystem, a computer device, and a storage management server which are connected via a network;
wherein the computer device is configured to provide one or more virtual machines;
wherein upon receiving information on a new virtual machine to be provided in the computer device, one of a first storage subsystem of the at least one storage subsystem or the storage management server creates a unique virtual port name for the new virtual machine and the first storage subsystem provides a volume for the new virtual machine, the first storage subsystem including a unique port name for a port through which the volume for the new virtual machine has I/O (Input/Output) connection via the network;
wherein the computer device receives the unique virtual port name for the new virtual machine and assigns the unique virtual port name to the new virtual machine under NPIV (N_Port ID Virtualization);
wherein QoS (Quality of Service) setting between the computer device and the first storage subsystem is configured using the unique virtual port name for the new virtual machine.

7. A computer system according to claim 6,
wherein the first storage subsystem provides a logical unit (LU) as the volume for the virtual machine, and configures I/O path, LUN (Logical Unit Number) masking, and QoS setting using the unique virtual port name for the new virtual machine.

8. A computer system according to claim 6,
wherein the network is a SAN (storage area network), and configures zoning and QoS setting using the unique virtual port name for the new virtual machine and the unique port name for the port of the first storage subsystem.

9. A computer system according to claim 6,
wherein the computer device configures I/O path and QoS setting using the unique virtual port name for the new virtual machine and the unique port name for the port of the first storage subsystem.

10. A computer system according to claim 6,
wherein the first storage subsystem creates the unique virtual port name for the new virtual machine; and
wherein the first storage subsystem includes a virtual port name table for storing the unique virtual port name of each virtual machine to be checked in creating a new virtual port name to avoid duplication.

11. A computer system according to claim 10,
wherein the storage management server includes a consolidated virtual port name table for storing the unique virtual port name of each virtual machine from all of the at least one storage subsystem to be checked in creating a new virtual port name to avoid duplication.

12. A computer system according to claim 6,
wherein the storage management server creates the unique virtual port name for the new virtual machine; and
wherein the storage management server includes a virtual port name table for storing the unique virtual port name of each virtual machine to be checked in creating a new virtual port name to avoid duplication.

13. A computer system according to claim 6,
wherein the unique virtual port name for the new virtual machine includes a set up command; and
wherein the at least one storage subsystem, the computer device, and the network configure themselves based on the set up command.

14. In a computer system having at least one storage subsystem, a computer device, and a storage management server which are connected via a network, a method of resource provisioning for a new virtual machine to be provided in the computer device, the method comprising:
creating a unique virtual port name for the new virtual machine by one of a first storage subsystem of the at least one storage subsystem or the storage management server;
providing a volume for the new virtual machine in the first storage subsystem, the first storage subsystem including a unique port name for a port through which the volume for the new virtual machine has I/O (Input/Output) connection via the network;
assigning the unique virtual port name to the new virtual machine in the computer device under NPIV (N_Port ID Virtualization);
configuring QoS (Quality of Service) setting between the computer device and the first storage subsystem using the unique virtual port name for the new virtual machine.

15. A method according to claim 14, wherein providing the volume comprises providing a logical unit (LU) as the volume in the first storage subsystem for the virtual machine, the method further comprising:
configuring I/O path, LUN (Logical Unit Number) masking, and QoS setting in the first storage subsystem using the unique virtual port name for the new virtual machine.

16. A method according to claim 14, wherein the network is a SAN (storage area network), the method further comprising:
configuring zoning and QoS setting in the SAN using the unique virtual port name for the new virtual machine and the unique port name for the port of the first storage subsystem.

17. A method according to claim 14, further comprising:
configuring I/O path and QoS setting in the computer device using the unique virtual port name for the new virtual machine and the unique port name for the port of the first storage subsystem.

18. A method according to claim 14, wherein the first storage subsystem creates the unique virtual port name for the new virtual machine, the method further comprising:
providing a virtual port name table in the first storage subsystem for storing the unique virtual port name of each virtual machine to be checked in creating a new virtual port name to avoid duplication.

19. A method according to claim 18, further comprising:
providing a consolidated virtual port name table in the storage management server for storing the unique virtual port name of each virtual machine from all of the at least one storage subsystem to be checked in creating a new virtual port name to avoid duplication.

20. A method according to claim 14, wherein the storage management server creates the unique virtual port name for the new virtual machine, the method further comprising:

providing a virtual port name table in the storage management server for storing the unique virtual port name of each virtual machine to be checked in creating a new virtual port name to avoid duplication.

21. A method according to claim 14, further comprising:
providing a set up command in the unique virtual port name for the new virtual machine;
wherein the at least one storage subsystem, the computer device, and the network configure themselves based on the set up command.

* * * * *